(12) United States Patent
Shan et al.

(10) Patent No.: US 12,338,561 B2
(45) Date of Patent: Jun. 24, 2025

(54) INTEGRATED BRAIDING AND NEEDLE PUNCHING PREFORM FORMING METHOD AND PREFORM FORMING DEVICE

(71) Applicant: NANJING UNIVERSITY OF AERONAUTICS AND ASTRONAUTICS, Jiangsu (CN)

(72) Inventors: Zhongde Shan, Jiangsu (CN); Zheng Sun, Jiangsu (CN); Zhengxi Zhou, Jiangsu (CN); Yaoyao Wang, Jiangsu (CN); Weihao Wang, Jiangsu (CN); Jiale Liu, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 0 days.

(21) Appl. No.: 18/587,731

(22) Filed: Feb. 26, 2024

(65) Prior Publication Data
US 2024/0191406 A1    Jun. 13, 2024

Related U.S. Application Data

(63) Continuation of application No. PCT/CN2022/128612, filed on Oct. 31, 2022.

(30) Foreign Application Priority Data

Sep. 15, 2022   (CN) .......................... 202211120616.3

(51) Int. Cl.
*D04C 3/48* (2006.01)
*D04C 1/02* (2006.01)
*D04C 3/46* (2006.01)

(52) U.S. Cl.
CPC ................. *D04C 3/48* (2013.01); *D04C 1/02* (2013.01); *D04C 3/46* (2013.01)

(58) Field of Classification Search
CPC .......... D04H 18/02; D04H 18/00; D04H 1/46; D04C 3/48; D04C 3/46; D04C 3/40;
(Continued)

(56) References Cited

U.S. PATENT DOCUMENTS

| 4,936,186 A | * | 6/1990 | Sekido ..................... D04C 1/06 87/8 |
| 5,649,414 A | * | 7/1997 | Rawdon ................... B66C 1/12 57/22 |

(Continued)

FOREIGN PATENT DOCUMENTS

| CN | 103835067 | 6/2014 |
| CN | 109281053 | 1/2019 |

(Continued)

OTHER PUBLICATIONS

"International Search Report (Form PCT/ISA/210) of PCT/CN2022/128612," mailed on Mar. 22, 2023, pp. 1-4.
(Continued)

*Primary Examiner* — Bao-Thieu L Nguyen
(74) *Attorney, Agent, or Firm* — JCIPRNET (57) ABSTRACT

The present invention discloses an integrated braiding and needle punching preform forming method, comprising the following steps: arranging gripping devices at both ends of a braiding machine, allowing a mandrel to move in a certain direction along the axis of the braiding machine while forming a first layer of fabric on a surface of the mandrel; then laying felt on top of the first layer of fabric by using an automatic felt laying device, and employing a needle punching device to perform pre-needle punching on the felt layer to ensure the felt adheres to the braided fabric surface; restarting the braiding machine, moving the mandrel in an opposite direction while forming a second layer of fabric on a surface of the felt; repeating the above steps to achieve multiple layers of braided fabric and felt in alternate adhe- (Continued)

sion; finally, performing main needle punching on the preform.

9 Claims, 7 Drawing Sheets

(58) Field of Classification Search
CPC ... D04C 3/24; D04C 3/08; D04C 3/00; D04C 1/06; D04C 1/002; D04C 1/00
USPC ........................................ 28/107, 110; 87/34
See application file for complete search history.

(56) References Cited

U.S. PATENT DOCUMENTS

| | | | | | |
|---|---|---|---|---|---|
| 5,688,577 | A * | 11/1997 | Smith | ................. | B32B 5/26 428/113 |
| 8,236,221 | B2 * | 8/2012 | Pepper | ................. | B29C 70/003 264/258 |
| 11,931,974 | B2 * | 3/2024 | Ikezaki | ................. | B29C 53/70 |
| 2005/0258575 | A1 * | 11/2005 | Kruse | ................. | B29C 70/32 264/573 |
| 2010/0023047 | A1 * | 1/2010 | Simpson | ............ | A61M 25/1038 606/192 |
| 2010/0052203 | A1 * | 3/2010 | Inazawa | ................. | D04C 3/08 264/103 |
| 2010/0083815 | A1 * | 4/2010 | Inazawa | ................. | B29C 70/32 87/9 |
| 2014/0277122 | A1 * | 9/2014 | Johnson | ................. | D07B 7/165 606/228 |
| 2017/0268141 | A1 * | 9/2017 | Sheehan | ................. | D04H 3/105 |
| 2020/0139644 | A1 * | 5/2020 | Ogale | ................. | B29C 53/005 |
| 2021/0301435 | A1 * | 9/2021 | Manz | ................. | D04C 3/48 |
| 2021/0307735 | A1 * | 10/2021 | Russo | ................. | B21F 45/008 |

FOREIGN PATENT DOCUMENTS

| | | |
|---|---|---|
| CN | 111169031 | 5/2020 |
| CN | 113136654 | 7/2021 |
| CN | 114919202 | 8/2022 |
| CN | 217147931 | 8/2022 |
| GB | 1358821 | 7/1974 |

OTHER PUBLICATIONS

"Written Opinion of the International Searching Authority (Form PCT/ISA/237) of PCT/CN2022/128612," mailed on Mar. 22, 2023, pp. 1-5.

* cited by examiner

INTEGRATED BRAIDING AND NEEDLE PUNCHING PREFORM FORMING METHOD AND PREFORM FORMING DEVICE

CROSS-REFERENCE TO RELATED APPLICATION

This application is a continuation of international application of PCT application serial no. PCT/CN2022/128612, filed on Oct. 31, 2022, which claims the priority benefit of China application no. 202211120616.3, filed on Sep. 15, 2022. The entirety of each of the above mentioned patent applications is hereby incorporated by reference herein and made a part of this specification.

TECHNICAL FIELD

The present invention relates to the technical field of composite material three-dimensional structured preform forming, and in particular to an integrated braiding and needle punching preform forming method and equipment.

RELATED ART

Composite materials refer to new types of materials formed by combining various materials through composite technology. These materials not only retain the characteristics of their original components but also acquire superior overall properties relative to the original components through the composite effect of the material combination. Advanced composite materials based on fiber reinforcement are extensively used in fields such as aerospace, automotive and marine, and rail transportation due to their high specific strength, high specific modulus, fatigue resistance, erosion resistance, impact resistance, and excellent designability.

Preforms, as the reinforcement of advanced composite materials, are a decisive factor in influencing their mechanical properties. Two-dimensional laminated preform composite materials have been developed earlier and the technology is more mature. They are currently the most widely used composite materials. However, their low interlaminar strength and poor resistance to shear and impact are limitations that hinder their application in complex extreme environments with high interlaminar shear stress and impact. Three-dimensional structured preform composite materials include interlaminar reinforcing fibers. Compared with the traditional two-dimensional structured composite materials, the three-dimensional interlaminar reinforced preform composite materials overcome the disadvantages of poor impact resistance and easy delamination in two-dimensional structured preform composite materials, exhibiting excellent mechanical properties and thus receiving increasing attention.

Three-dimensional structured preforms are typically obtained through textile means, with corresponding weaving and non-weaving forming technologies including three-dimensional weaving, three-dimensional braiding, three-dimensional stitching, flexible guided three-dimensional weaving, and three-dimensional needle punching. The three-dimensional needle punching technology refers to a method that involves layering two-dimensional fabrics with a felt and then needle punching to form interlaminar reinforcement. Compared with other three-dimensional structured preform forming technologies, this method is simple and cost-effective, attracting significant attention. Regarding the currently adopted needle punching/two-dimensional fabric composite forming technology, the processes of two-dimensional fabric forming, laying, and needle punching are conducted independently, with each process requiring manual involvement. This results in low production efficiency and challenges in ensuring product quality. However, as the composite material industry increasingly seeks efficiency and cost reduction in preform forming technology, there is an urgent need for integrated forming methods and equipment for automated needle punching/two-dimensional fabrics to achieve this goal.

SUMMARY OF INVENTION

Technical Problem

The objective of the present invention is to address the deficiencies in the prior art by proposing an integrated braiding and needle punching preform forming method. This method aims to achieve integrated automatic forming of multi-layered braided fabrics through continuous braiding and needle punching.

Solution to Problem

The present invention further provides a preform forming device for implementing the aforementioned integrated braiding and needle punching preform forming method.

To achieve the aforementioned technical objectives, the present invention adopts the following technical solutions: an integrated braiding and needle punching preform forming method and equipment, with specific details as follows:

Provided is an integrated braiding and needle punching preform forming method, comprising the following steps:
(1) arranging a gripping device at each end of a braiding machine, and using the gripping device at one end of the braiding machine to grip one end of a mandrel, the mandrel moving along an axis thereof, causing yarns to form a first layer of fabric on a surface of the mandrel that covers the surface of the mandrel;
(2) ceasing to braid after completing the first fabric coverage in step (1);
(3) laying felt on the first layer of fabric that covers the surface of the mandrel by using an automatic felt laying device, and performing pre-needle punching by a needle punching device to make the felt adhere to a surface of the first layer of fabric;
(4) releasing the end of the mandrel from the original gripping device that gripped the mandrel;
(5) restarting the braiding machine, at the same time, the gripping device at the other end gripping the other end of the mandrel and moving in a direction opposite to the moving direction along the axis of the mandrel as in step (1), continuing to braid a second layer of fabric, and ensuring that the second layer of fabric closely adheres to and completely covers a surface of the felt;
(6) repeating the above steps to achieve multiple layers of braided fabric and felt in alternate and tight adhesion to form a preform; and
(7) finally, performing main needle punching on the preform by using the automatic needle punching device.

The preform forming device provided according to the present invention, which is used to implement the aforementioned integrated braiding and needle punching preform forming method, employs the following technical solutions.

The preform forming device comprises a braiding machine, an irregular structure mold, mandrel gripping devices located at both ends of the braiding machine, an automatic felt laying device, and an automatic needle punching device, wherein the mandrel gripping device comprises a claw and a claw mounting platform, with the claw mounted on the claw mounting platform; a motion device that enables the gripping device to move horizontally is mounted on the claw mounting platform; the automatic felt laying device comprises a first mechanical arm, a first arc-shaped support ring, a limiting roller, drive gears, a felt winding roller, a felt cutting knife, a vacuum adsorption device, an adhesive release device, a first arc-toothed ring, and a felt laying platform, wherein the first arc-shaped support ring is mounted on the first mechanical arm, the first limiting roller, the first drive gears, and the first arc-toothed ring are mounted on the first arc-shaped support ring, the felt winding roller and the felt laying platform are mounted on the first arc-toothed ring, the felt cutting knife, the vacuum adsorption device, and the adhesive release device are mounted on the felt laying platform, and the first mechanical arm is connected to a device capable of horizontal movement; at least two first drive gears are mounted on an inner side of the first arc-toothed ring, and the rotation of the two first drive gears drives the first arc-toothed ring and the first arc-shaped support ring to rotate forward or backward; the automatic needle punching device comprises a second mechanical arm, a second arc-shaped support ring, a second arc-toothed ring, a second limiting roller, second drive gears, and a needle punching head, wherein the second arc-shaped support ring is mounted on the second mechanical arm, the second arc-toothed ring, the second limiting roller, and the second drive gears are all mounted on the second arc-shaped support ring, the needle punching head is mounted on the second arc-toothed ring, and the second mechanical arm is equipped with a device that enables the second mechanical arm to move horizontally; at least two second drive gears are mounted on an inner side of the second arc-toothed ring, and the rotation of the two second drive gears drives the second arc-toothed ring and the second arc-shaped support ring to rotate forward or backward.

Furthermore, the claws of the two gripping devices both pull a mandrel and fabric to independently or cooperatively move horizontally on both sides of a braiding plane along a braiding loop axis, without interfering with yarns; at the same time, during a braiding process, the claws on the gripping devices apply a certain pre-tightening force to the mandrel and the fabric, ensuring that the fabric closely adheres to and completely covers a surface of the mandrel, thereby forming a fabric contour identical to the surface of the mandrel.

Furthermore, the claws are controlled to automatically release or clamp ends of the mandrel and the fabric, including using one of the pneumatic, electromagnetic, or mechanical methods.

Furthermore, felt laying and pre-needle punching are achieved through the coordination of the automatic laying device and the automatic needle punching device, enabling felt to fully adhere to a surface of a braided fabric.

Furthermore, in the automatic felt laying device, the felt winding roller is wrapped with felt to provide the felt to the felt laying platform; the first arc-shaped support ring, the first limiting roller, and the first drive gears are used to facilitate the rotation of the first arc-toothed ring around a center and limit the movement thereof within an annular range; when the vacuum adsorption device is activated, a negative pressure is created on a surface of the vacuum adsorption device to tightly adsorb the felt; the adhesive release device releases adhesive to adhere the felt onto a fabric surface, and the felt is then bonded to the fabric surface by compression at an end of the felt laying platform.

Furthermore, in the automatic needle punching device, the needle punching head releases needles and draws the needles from fabric; a sensor is mounted above the needle punching head for sensing a relative position of the needles to a surface of the fabric, and a movement posture of the second mechanical arm is controlled based on the position information collected; additionally, the needles of the needle punching head are parallel to a normal direction of a fabric plane.

Furthermore, connection holes for mounting the felt laying platform are formed on the first arc-shaped support ring, and connection holes for mounting the needle punching head are formed on the second arc-shaped support ring.

Furthermore, both the first arc-shaped support ring and the second arc-shaped support ring are equipped with position sensors for determining positions of the first arc-toothed ring and the second arc-toothed ring and preventing the first arc-toothed ring and the second arc-toothed ring from disengaging from the first drive gears and the second drive gears as well as the first limiting roller and the second limiting roller.

Effects of Invention

Compared to the prior art, the beneficial effects of the present invention are as follows: The present invention innovatively proposes, based on the traditional 2.5D braiding machine, a method of braiding in a reciprocating manner by adhering to the surface of the mandrel, laying felt for pre-needle punching, followed by full needle punching. An equipment capable of integrating automatic and continuous braiding and needle punching of two-dimensional fabrics is established. In contrast to the existing fully manual or semi-automatic fabric laying and fiber Z-direction reinforcement composite technologies, the method and equipment proposed by the present invention can achieve integrated automatic forming of multi-layered braided fabrics through continuous braiding and needle punching. This significantly improves the efficiency of forming three-dimensional structured preforms through braiding/needle punching and enhances the reliability of the products.

DESCRIPTION OF EMBODIMENTS

The technical solutions of the present invention are further described below with reference to the accompanying drawings.

In response to the issues of low efficiency and high costs arising from the independent processes of two-dimensional fabric preparation, laying, and needle punching, which all rely on manual involvement in the traditional braiding/needle punching composite process, the present invention provides an integrated braiding and needle punching forming method and a corresponding preform forming device based on this method.

As shown in FIGS. 2 to 7, an embodiment of the preform forming device comprises a braiding machine, an irregular structure mold, mandrel gripping devices located at both ends of the braiding machine, an automatic felt laying device, and an automatic needle punching device.

Figure 1:
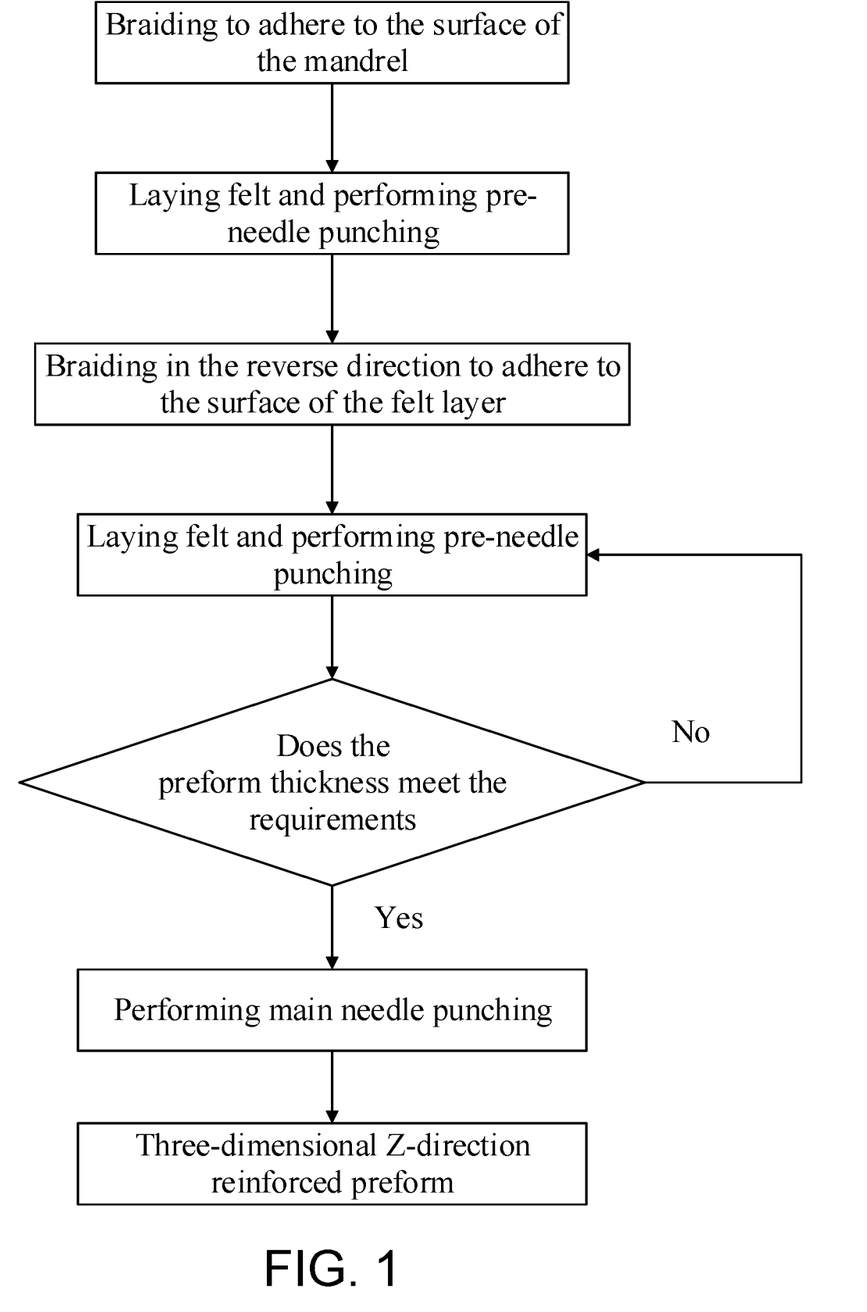
FIG. 1 is a flowchart of an integrated braiding and needle punching forming method according to the present invention.
Figure 2:
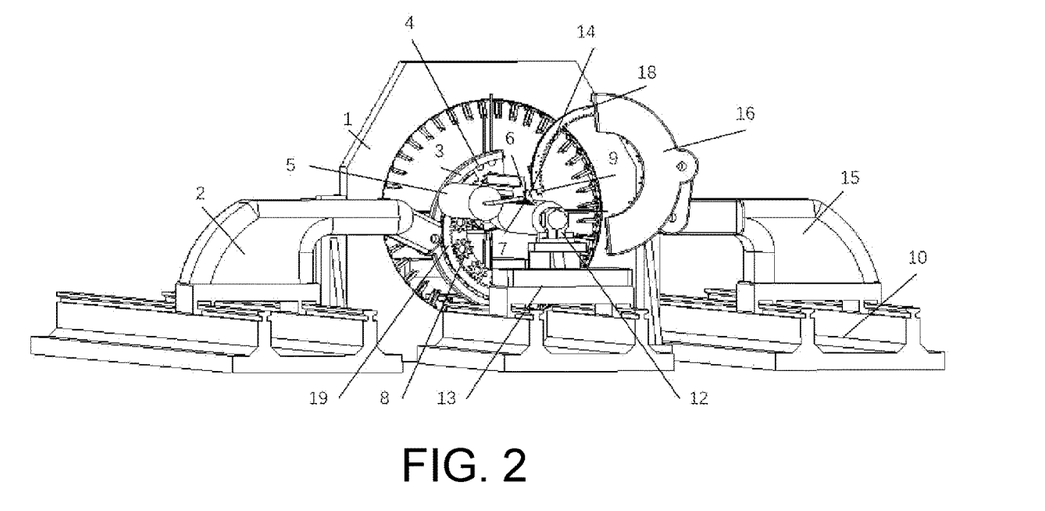
FIG. 2 is a schematic diagram of the structure of the integrated braiding and needle punching forming equipment (Direction 1) according to the present invention.
Figure 3:
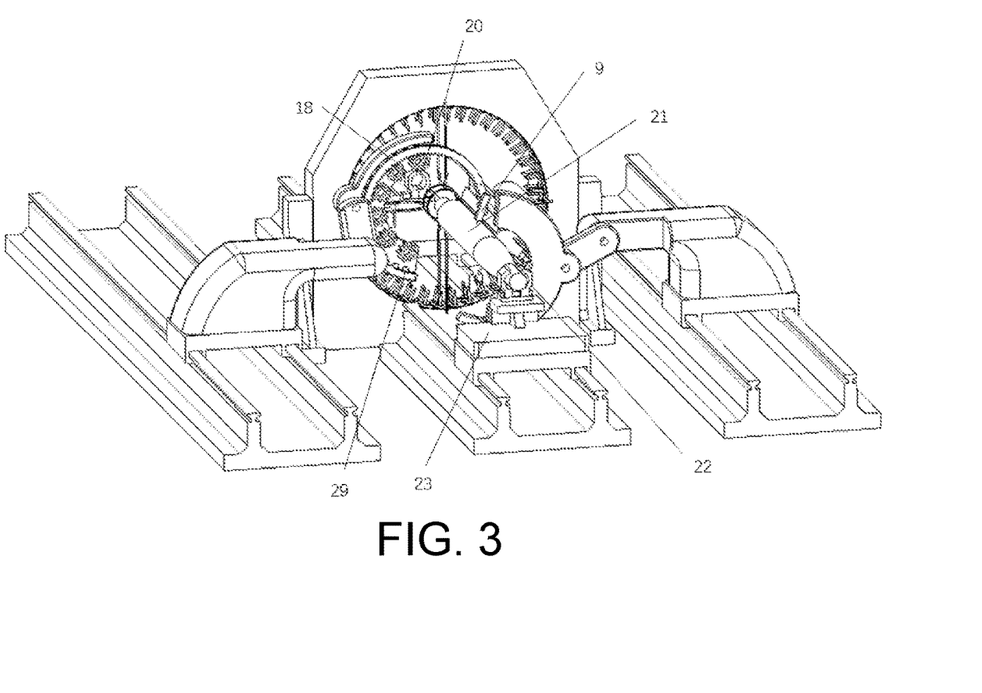
FIG. 3 is a schematic diagram of the structure of the integrated braiding and needle punching forming equipment (Direction 2) according to the present invention.

The mandrel gripping devices comprise two structurally identical units disposed at the axial ends of the braiding machine. The mandrel gripping device at one end comprises a claw 12 and a claw mounting platform 13, with the claw 12 mounted on the claw mounting platform 13. A motion device that enables the gripping device to move horizontally along the axial direction is mounted on the claw mounting platform 13. The mandrel gripping device at the other end comprises a claw 22 and a claw mounting platform 23, with the claw 22 mounted on the claw mounting platform 23. A motion device that enables the gripping device to move horizontally along the axial direction is mounted on the claw mounting platform 23. The claws of the two gripping devices both pull the mandrel and fabric to independently or cooperatively move horizontally on both sides of the braiding plane along the braiding loop axis, without interfering with the yarns. At the same time, during the braiding process, the claws on the gripping devices apply a certain pre-tightening force to the mandrel and fabric, ensuring that the fabric closely adheres to and completely covers the surface of the mandrel, thereby forming a fabric contour identical to the surface of the mandrel. The claws are controlled to automatically release or clamp the ends of the mandrel and fabric, including using one of the pneumatic, electromagnetic, or mechanical methods.

Figure 6:
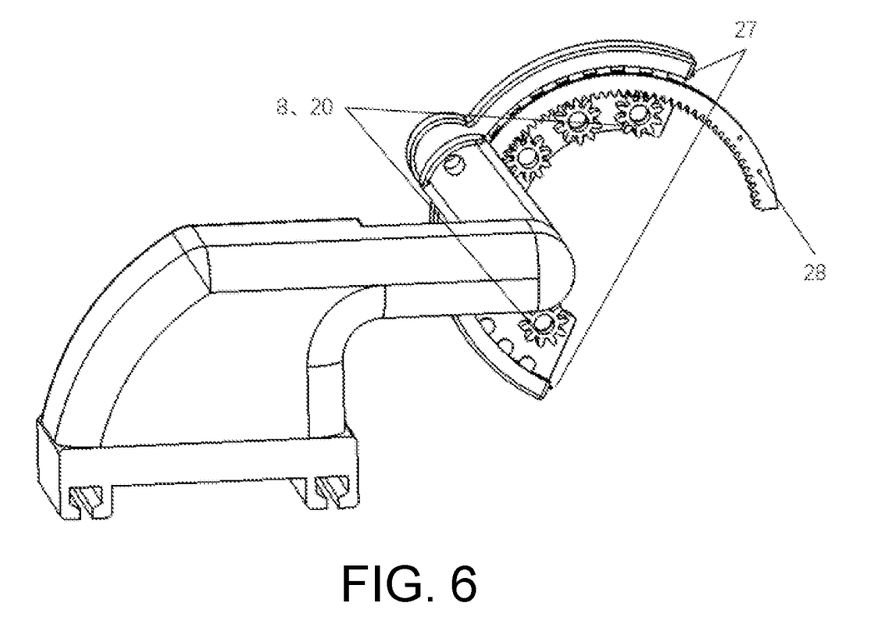
FIG. 6 is a schematic diagram of the device equipped with a needle punching head and a felt laying platform according to the present invention.

The automatic felt laying device comprises a first mechanical arm 2, a first arc-shaped support ring 3, a limiting roller 4, drive gears 8, a felt winding roller 5, a felt cutting knife 6, a vacuum adsorption device 7, an adhesive release device 11, a first arc-toothed ring 19, and a felt laying platform 14. The first arc-shaped support ring 3 is mounted on the first mechanical arm 2. The first limiting roller 4, the first drive gears 8, and the first arc-toothed ring 19 are mounted on the first arc-shaped support ring 3. The felt winding roller 5 and the felt laying platform 14 are mounted on the first arc-toothed ring 19. The felt cutting knife 6, the vacuum adsorption device 7, and the adhesive release device 11 are mounted on the felt laying platform. The first mechanical arm 2 is connected to a device capable of horizontal movement. At least two first drive gears 8 are mounted on the inner side of the first arc-toothed ring 19, and the rotation of the two first drive gears 8 drives the first arc-toothed ring 19 and the first arc-shaped support ring 3 to rotate forward or backward. The automatic needle punching device comprises a second mechanical arm 15, a second arc-shaped support ring 18, a second arc-toothed ring 18, a second limiting roller 29, second drive gears 20, and a needle punching head 9. The second arc-shaped support ring 18 is mounted on the second mechanical arm 15. The second arc-toothed ring 18, the second limiting roller 29, and the second drive gears 20 are all mounted on the second arc-shaped support ring 18. The needle punching head 9 is mounted on the second arc-toothed ring 18. The second mechanical arm 15 is equipped with a device that enables it to move horizontally. At least two second drive gears 20 are mounted on the inner side of the second arc-toothed ring 18, and the rotation of the two second drive gears 20 drives the second arc-toothed ring 18 and the second arc-shaped support ring 18 to rotate forward or backward. Connection holes for mounting the felt laying platform 14 are formed on the first arc-shaped support ring 3, and connection holes for mounting the needle punching head 9 are formed on the second arc-shaped support ring 18. Both the first arc-shaped support ring 3 and the second arc-shaped support ring 18 are equipped with position sensors 27 for determining the positions of the first arc-toothed ring 18 and the second arc-toothed ring 19 and preventing the first arc-toothed ring 18 and the second arc-toothed ring 19 from disengaging from the first drive gears 8 and the second drive gears 20 as well as the first limiting roller 4 and the second limiting roller 29.

In the automatic felt laying device, the felt winding roller 5 is wrapped with the felt to provide the felt to the felt laying platform 14. The first arc-shaped support ring 3, the first limiting roller 4, and the first drive gears 8 are used to facilitate the rotation of the first arc-toothed ring 19 around the center and limit the movement thereof within an annular range. When the vacuum adsorption device 7 is activated, a negative pressure is created on the surface of the vacuum adsorption device 7 to tightly adsorb the felt. The adhesive release device 11 releases adhesive to adhere the felt onto the fabric surface, and the felt is then bonded to the fabric surface by compression at the end of the felt laying platform 14. In the automatic needle punching device, the needle punching head 9 releases needles and draws the needles from the fabric. A sensor is mounted above the needle punching head 9 for sensing the relative position of the needles to the fabric surface, and the movement posture of the second mechanical arm 15 is controlled based on the position information collected. Additionally, the needles of the needle punching head 9 are parallel to the normal direction of the fabric plane. The felt laying and pre-needle punching are achieved through the coordination of the automatic laying device and the automatic needle punching device, enabling the felt to fully adhere to the surface of the braided fabric.

Figure 4:
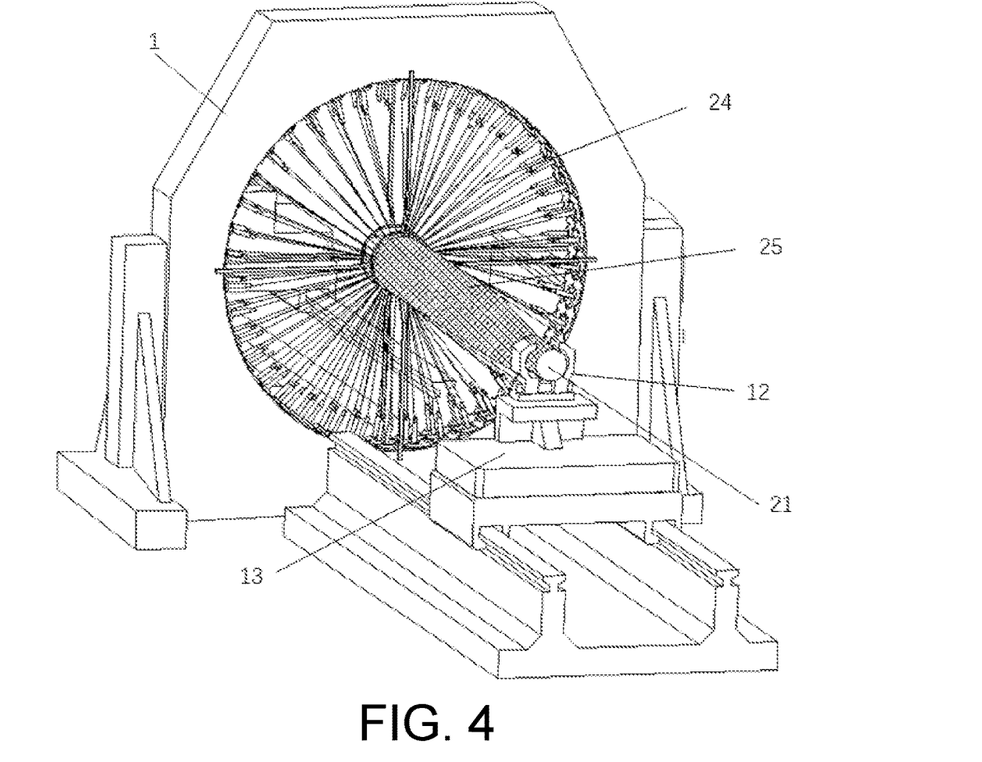
FIG. 4 is a schematic diagram illustrating the gripping device claw gripping the mandrel towards its direction for braiding according to the present invention.

An embodiment of the integrated braiding and needle punching forming method provided by the present invention is as follows: (1) Gripping devices are arranged at both ends of a 2.5D braiding machine 1, as shown in FIG. 4, where the claw 12 on one of the gripping devices grips one end of the mandrel 21, allowing the braiding mandrel 21 to move along the axis of the braiding machine in the direction indicated by a certain arrow, thereby enabling yarn 24 to form a first layer of fabric 25 on the surface of the mandrel.

Figure 5:
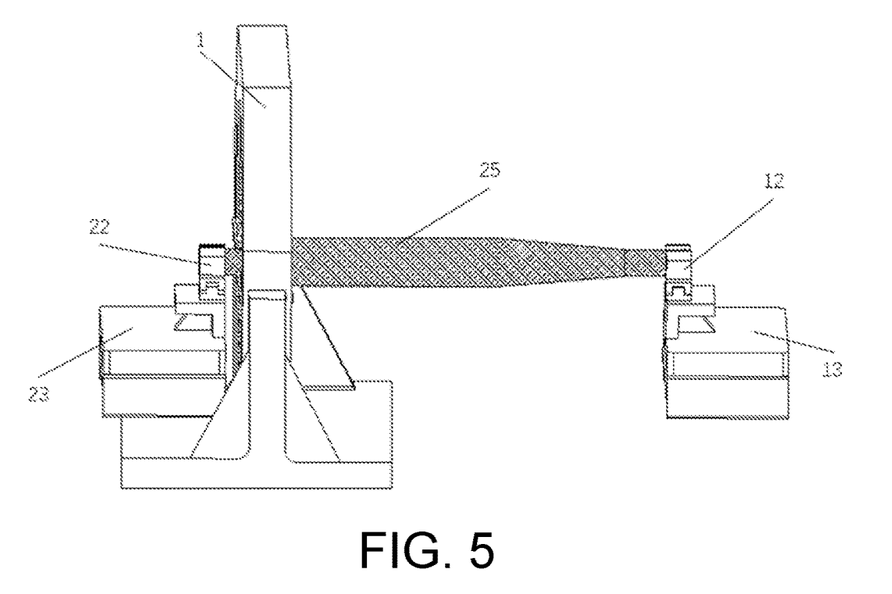
FIG. 5 is a schematic diagram of the gripping device claw (22) gripping the mandrel that has completed braiding coverage according to the present invention.

(2) As shown in FIG. 5, the braiding ceases after completing the first fabric coverage in step (1), and the claw 22 on the gripping device at the other end grips the other end of the mandrel 21.

Figure 7:
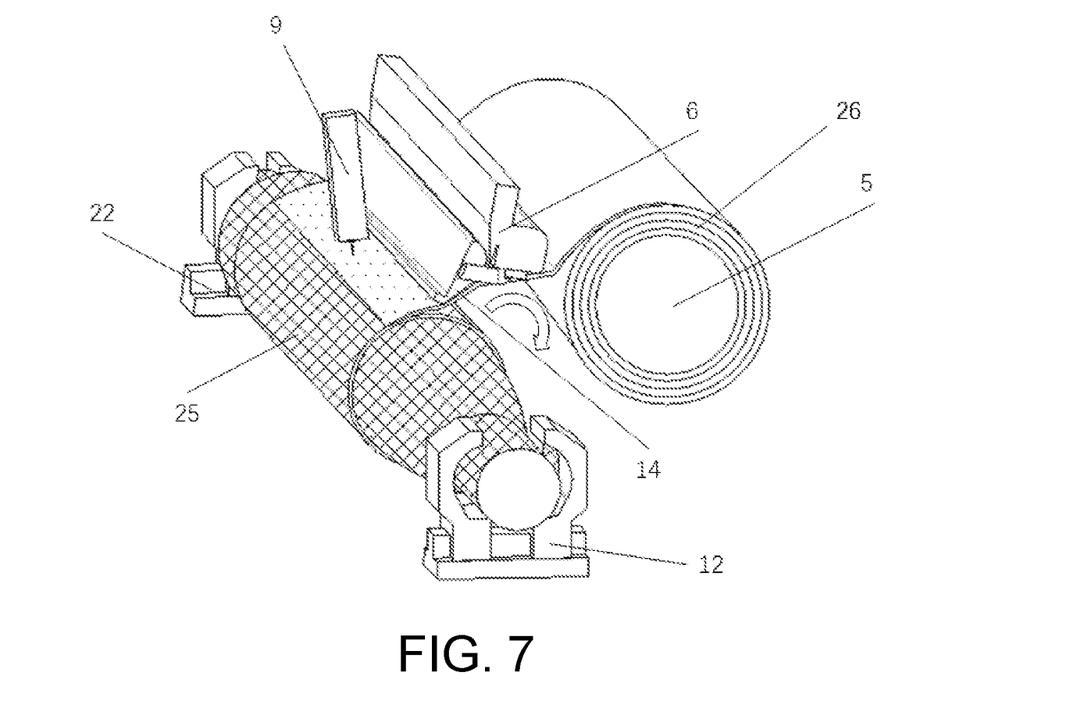
FIG. 7 is a schematic diagram illustrating the felt laying and pre-needle punching process according to the present invention.
Figure 8:
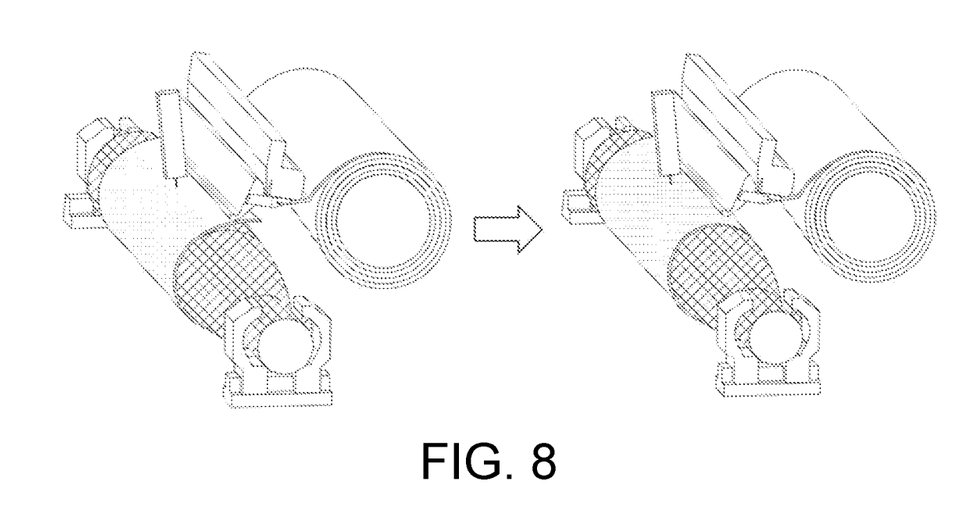
FIG. 8 is a schematic diagram illustrating the completion of one cycle of felt laying and the trimming of the felt according to the present invention.

(3) As shown in FIG. 7, the automatic felt laying device and the automatic needle punching device move to the side of the fabric and mold through a horizontal motion device to commence operation. The felt winding roller 5 begins to gradually release the felt 26 through rotation. The vacuum adsorption device 7 is activated to tightly adsorb the felt 26 to the end of the felt laying platform 14. The first mechanical arm 2, the first arc-shaped support ring 3, and the first arc-toothed ring 19 (driven by the first drive gears 8 and limited by the first limiting roller 4) work in conjunction to press the felt 26 onto the surface of the first layer of fabric 25 with an appropriate pre-pressure by the end of the felt laying platform 14. At the same time, the adhesive release device 11 releases adhesive to bond the felt 26 to the surface of the first layer of fabric 25. Subsequently, the vacuum adsorption device 7 ceases its action. While the felt 26 is being laid, the needle punching device senses its distance from the felt 26 with a distance sensor. Through the processing of this distance information, the posture of the second mechanical arm 15, the second arc-shaped support ring 18, and the second arc-toothed ring 19 are adjusted to position the needle punching head 9 at the designated location. The needle punching head 9 rotates to the normal direction of the plane of the first layer of fabric 25 for pre-needle punching. As shown in FIG. 8, after completing one cycle of felt laying and pre-needle punching, the felt 26 is cut using the felt cutting knife 6, and the vacuum adsorption device 7 is reactivated to tightly adsorb the felt 26 to the end of the felt laying platform 14.

(4) The claw 12 on the mandrel gripping device releases the mandrel.

Figure 9:
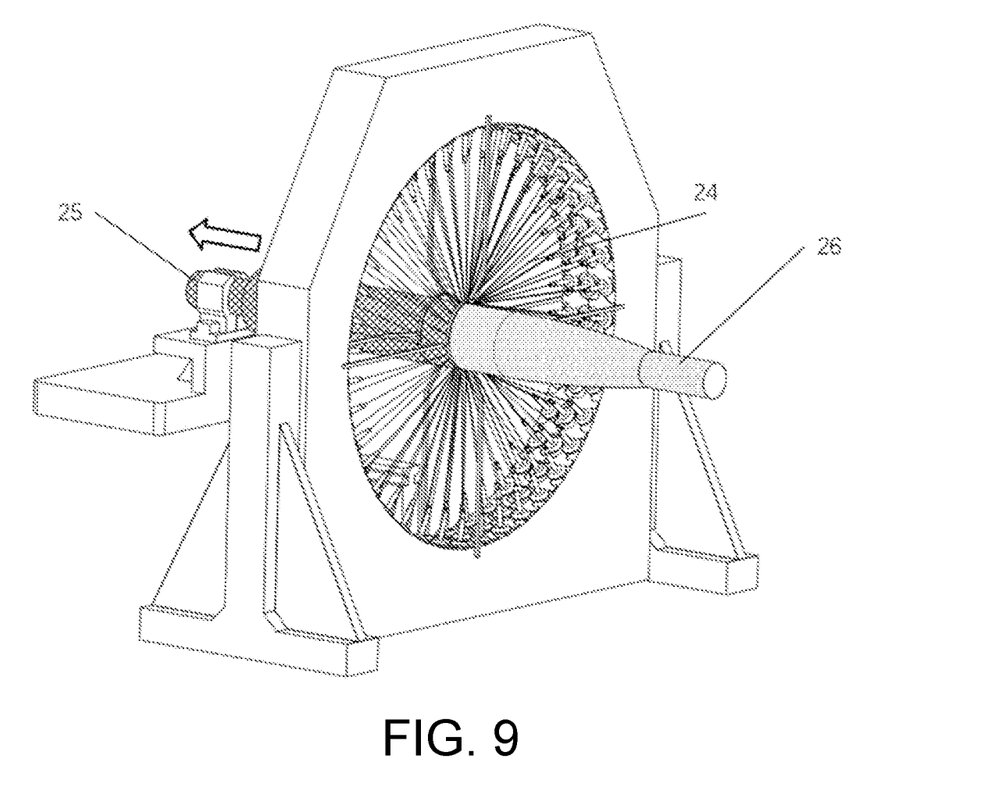
FIG. 9 is a schematic diagram illustrating the braiding process on the surface of the felt according to the present invention.
Figure 10:
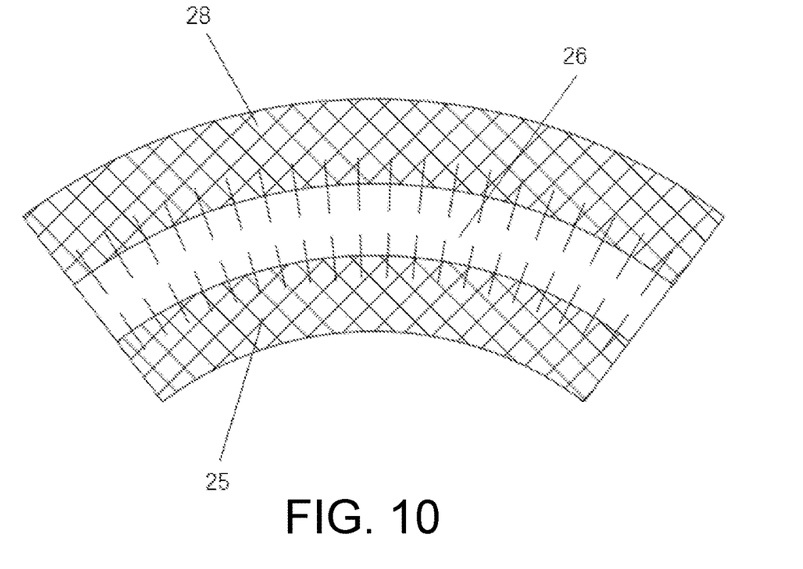
FIG. 10 is a schematic diagram of the fan-shaped cross-section of the braided layer-felt layer-braided layer according to the present invention.

(5) As shown in FIG. 9, the braiding machine restarts, and at the same time, the claw 22 on the gripping device grips the mandrel and moves it toward the opposite direction. This starts the formation of the second layer of fabric 28 by braiding the yarn 24, ensuring that the second layer of fabric 28 closely adheres to and completely covers the surface of the felt 26. The current resulting fan-shaped cross-section of the braided layer-needle-punched layer-braided layer preform is as shown in FIG. 10.

Figure 12:
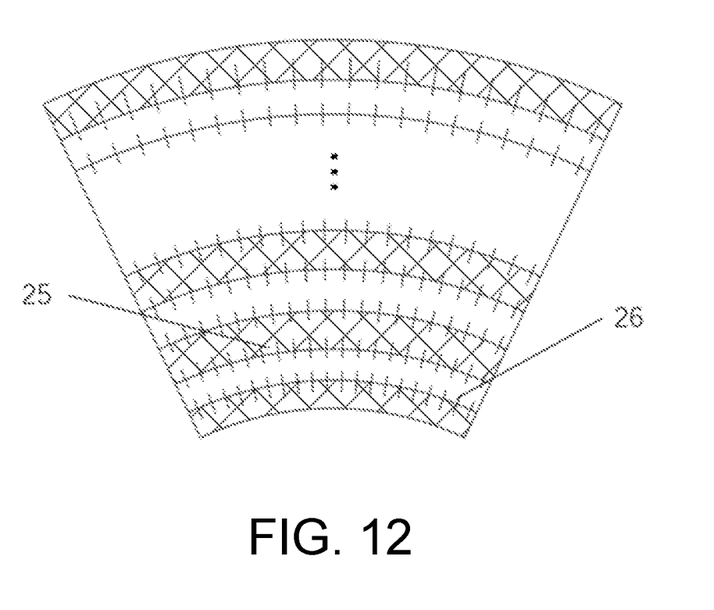
FIG. 12 is a schematic diagram of the fan-shaped cross-section of the final product according to the present invention.

(6) The above steps are repeated to achieve multiple layers of braided fabric and felt in alternate adhesion. The resulting fan-shaped cross-section of the preform is shown in FIG. 12.

Figure 11:
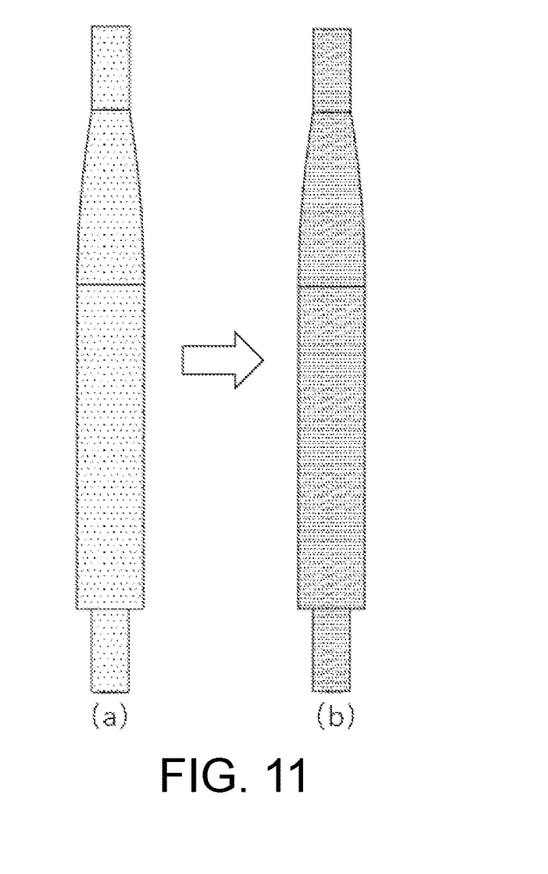
FIG. 11 is a schematic diagram comparing the results of pre-needle punching and main needle punching according to the present invention.

(7) Finally, as shown in FIG. 5, the preform is subjected to main needle punching using the automatic needle punching device, with FIG. 11 showing a comparison of the effects of pre-needle punching (a) and main needle punching (b).

The aforementioned descriptions are merely preferred embodiments of the present invention, and the protection scope of the present invention is not limited to the above embodiments. Any technical solutions that fall within the scope of the inventive concept of the present invention are within the protection scope of the present invention. It should be noted that for those skilled in the art, various modifications and enhancements made without departing from the principles of the present invention should be considered within the protection scope of the present invention.

What is claimed is:

1. An integrated braiding and needle punching preform forming method, comprising following steps:
    (1) arranging two gripping devices at two ends of a braiding machine, and using the gripping device at one end of the braiding machine to grip one end of a mandrel, the mandrel moving along an axis thereof, causing yarns to form a first layer of fabric on a surface of the mandrel covering the surface of the mandrel;
    (2) ceasing to braid after completing the first layer of fabric in step (1);
    (3) laying a felt on the first layer of fabric covering the surface of the mandrel by using an automatic felt laying device, and performing pre-needle punching by a needle punching device to make the felt adhere to a surface of the first layer of fabric;
    (4) releasing one end of the mandrel from the gripping device that gripped the mandrel;
    (5) at the same time, the gripping device at the other end of the braiding machine gripping the other end of the mandrel and moving in a direction opposite to the mandrel moving along the axis as in step (1), continuing to braid a second layer of fabric, and ensuring that the second layer of fabric closely adheres to and completely covers a surface of the felt;
    (6) repeating the above steps to achieve the multiple layers of braided fabric and the felt in alternate and tight adhesion to form a preform; and
    (7) finally, performing main needle punching on the preform by using the automatic needle punching device.

2. A preform forming device for implementing the integrated braiding and needle punching preform forming method according to claim 1, comprising the braiding machine, an irregular structure mold, the two gripping devices located at both ends of the braiding machine, the automatic felt laying device, and the automatic needle punching device, wherein
    each of the two gripping devices comprises a claw and a claw mounting platform, with the claw mounted on the claw mounting platform; a motion device that enables the two gripping devices to move horizontally is mounted on the claw mounting platform;
    the automatic felt laying device comprises a first mechanical arm, a first arc-shaped support ring, a limiting roller, drive gears, a felt winding roller, a felt cutting knife, a vacuum adsorption device, an adhesive release device, a first arc-toothed ring, and a felt laying platform, wherein the first arc-shaped support ring is mounted on the first mechanical arm, a first limiting roller, at least two first drive gears, and the first arc-toothed ring are mounted on the first arc-shaped support ring, the felt winding roller and the felt laying platform are mounted on the first arc-toothed ring, the felt cutting knife, the vacuum adsorption device, and the adhesive release device are mounted on the felt laying platform, and the first mechanical arm is connected to a device moved horizontally; the at least two first drive gears are mounted on an inner side of the first arc-toothed ring, and the rotation of the at least two first drive gears drives the first arc-toothed ring and the first arc-shaped support ring to rotate forward or backward;
    the automatic needle punching device comprises a second mechanical arm, a second arc-shaped support ring, a second arc-toothed ring, a second limiting roller, at least two second drive gears, and a needle punching head, wherein the second arc-shaped support ring is mounted on the second mechanical arm, the second arc-toothed ring, the second limiting roller, and the at least two second drive gears are all mounted on the second arc-shaped support ring, the needle punching head is mounted on the second arc-toothed ring, and the second mechanical arm is equipped with a device that enables the second mechanical arm to move horizontally; the at least two second drive gears are mounted on an inner side of the second arc-toothed ring, and the rotation of the at least two second drive gears drives the second arc-toothed ring and the second arc-shaped support ring to rotate forward or backward.

3. The preform forming device according to claim 2, wherein the claws of the two gripping devices both pull the mandrel and the fabric to independently or cooperatively move horizontally on both sides of a braiding plane along a braiding loop axis, without interfering with yarns; at the same time, during a braiding process, the claws on the two gripping devices apply a certain pre-tightening force to the mandrel and the fabric, ensuring that the fabric closely adheres to and completely covers a surface of the mandrel, thereby forming a fabric contour identical to the surface of the mandrel.

4. The preform forming device according to claim 3, wherein the claws are controlled to automatically release or clamp ends of the mandrel and the fabric, including using one of the pneumatic, electromagnetic, or mechanical methods.

5. The preform forming device according to claim 2, wherein felt laying and pre-needle punching are achieved through the coordination of the automatic laying device and the automatic needle punching device, enabling felt to fully adhere to a surface of a braided fabric.

6. The preform forming device according to claim 2, wherein in the automatic felt laying device, the felt winding roller is wrapped with the felt to provide the felt to the felt laying platform; the first arc-shaped support ring, the first limiting roller, and the first drive gears are used to facilitate the rotation of the first arc-toothed ring around a center and limit the movement thereof within an annular range; when the vacuum adsorption device is activated, a negative pressure is created on a surface of the vacuum adsorption device to tightly adsorb the felt; the adhesive release device releases adhesive to adhere the felt onto a fabric surface, and the felt is then bonded to the fabric surface by compression at an end of the felt laying platform.

7. The preform forming device according to claim 2, wherein in the automatic needle punching device, the needle punching head releases needles and draws the needles from fabric; a sensor is mounted above the needle punching head for sensing a relative position of the needles to a surface of the fabric, and a movement posture of the second mechanical arm is controlled based on the position information collected; additionally, the needles of the needle punching head are parallel to a normal direction of a fabric plane.

8. The preform forming device according to claim 2, wherein connection holes for mounting the felt laying platform are formed on the first arc-shaped support ring, and connection holes for mounting the needle punching head are formed on the second arc-shaped support ring.

9. The preform forming device according to claim 3, wherein both the first arc-shaped support ring and the second arc-shaped support ring are equipped with position sensors for determining positions of the first arc-toothed ring and the second arc-toothed ring and preventing the first arc-toothed ring and the second arc-toothed ring from disengaging from the first drive gears and the second drive gears as well as the first limiting roller and the second limiting roller.

* * * * *